May 23, 1944.  H. BRAND  2,349,587

METHOD FOR MANUFACTURING LIDS FOR HERMETICALLY CLOSING CONTAINERS

Filed Dec. 5, 1941

INVENTOR
HERBERT BRAND
by Young, Emery & Thompson ATTYS.

Patented May 23, 1944

2,349,587

UNITED STATES PATENT OFFICE 2,349,587

METHOD FOR MANUFACTURING LIDS FOR HERMETICALLY CLOSING CONTAINERS

Herbert Brand, Zollikon, Switzerland

Application December 5, 1941, Serial No. 421,840
In Switzerland October 30, 1940

9 Claims. (Cl. 113—80)

This invention relates to a method of making a lid for a container adapted to be hermetically closed.

In containers of different kinds, specially in cans, when resealing is desired, it is necessary that the lid be hermetically closed and capable of being repeatedly opened and closed without destruction of the seal or gasket material. For this purpose a rubber ring is generally used as a seal between the lid and the container.

When it is desired to fix the rubber ring in such a way that, on opening the can, it is not entirely loosened, it is usually previously warmed and then pressed into the joint in a plastic state. Through this procedure the rubber loses its elasticity and retains the form imparted to it on the first closing. Therefore, if the joint surface of the lid becomes deformed as may be the case on opening and reclosing, it no longer makes a complete sealing contact with the gasket. Also, in the course of time, the rubber becomes hard. Hence, this manner of rubber sealing is inadequate for a resealable container.

If heating is avoided and the rubber ring allowed to adhere to the joint surface due to its elasticity only, then, if a hermetic closing is to be obtained, it must be of such a width as is normally not usual in can-making. This, however, results in a strong rubber-odour, which is not admissible in dealing with foodstuffs.

It has also been proposed to use a coating of regenerated cellulose to hold the rubber ring fast and make it smooth. Experience has shown that it is very difficult to make such a seal absolutely inodorous and to obtain complete inertness of the cellulose to water, and acid and alkaline contents of the cans.

The primary object of the present invention is to overcome the aforesaid disadvantages of prior container seals. The result is achieved by using as sealing material a plastic substance containing bitumen and rubber.

Figure 1:
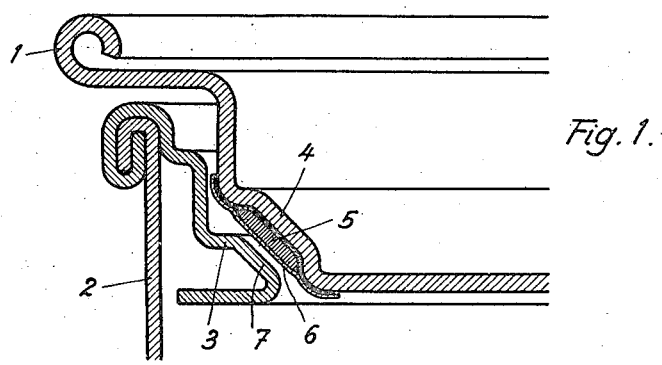
Figure 2:
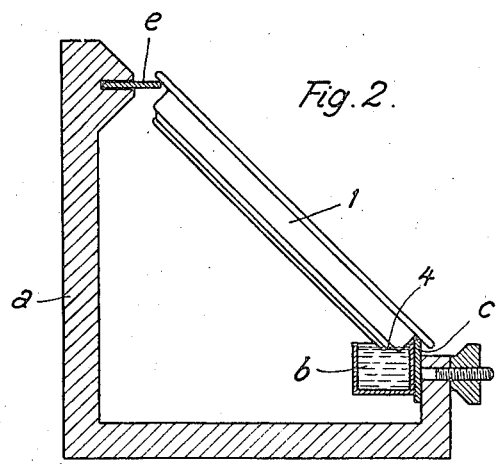
Figure 3:
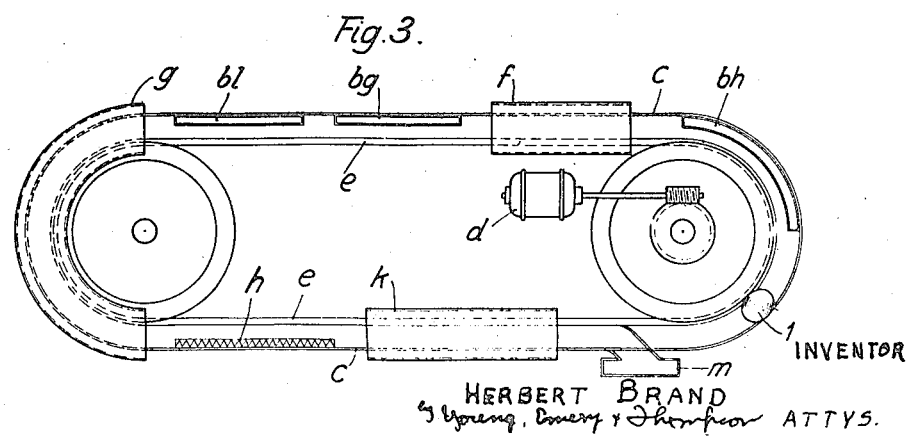

Other objects and features of the invention will be apparent as the following description proceeds, reference being had to the accompanying drawing in which Fig. 1 is a section, on an enlarged scale, through a portion of a container made according to the invention, Fig. 2 is a schematic view of a portion of apparatus for carrying out the method and Fig. 3 is a similar view of the whole apparatus.

Referring to Fig. 1 the lid 1 is fixed, either by clamping or screwing, i. e., by means of a bayonet catch or threads, to the ring 3 attached to the container 2. This fixing means is not shown in the drawing.

The lid 1 has a groove 4, to which a plastic, slightly elastic substance 5 comprising rubber and bitumen is applied as a sealing means between lid and container. In order to obtain a close contact between this substance and the lid and to prevent air from diffusing between the lid 1 and the substance 5, the lid is heated. Thereby a portion of the bitumen included in the substance 5 oozes out and establishes a close contact with the groove 4. Owing to the oozing out of the bitumen the substance 5, after cooling down, becomes very smooth, because the microscopic surface pores of the rubber are filled by the oozed bitumen. Thus the substance slides very well on the projecting surface 7 provided on the ring 3.

A further improvement of the sliding quality may be obtained by covering the substance 5 with a coating of lacquer 6 into which the oozed bitumen penetrates when heating the lid. This coating may thus be extremely thin and without any mechanical strength of its own.

The small quantity of lacquer as well as the penetration of the same by bitumen prevents any formation of unpleasant odour or leakage through to the pores, in contrast to the well-known cellulose coatings.

The advantages obtained by the mixture of bitumen and rubber are complete inodorousness and increased resistance to chemical or mechanical action.

In order to improve the adhesion between the substance 5 and the groove 4, the latter may be covered by a film of resin. For this purpose, the melting point of the resin is chosen so that a liquefaction takes place on heating the lid and oozed bitumen and resin flow into each other.

For executing the method according to the invention, a device is used as, by way of example, is shown in Fig. 2 in a cross section and in Fig. 3 in a schematic top view.

At the outer edge and on the lower part of a frame $a$ which, in a horizontal projection, has an oblong form rounded at both ends (Fig. 3), channel-like troughs $b_h$, $b_g$, $b_l$ are arranged. They all bear against a rail $c$ extending round the frame $a$. On the upper part of the latter a conveyor band $e$ driven by a motor $d$ is placed. The lids $l$ are put, one after the other, on to the rail $c$ and lean against the conveyor band $e$. When the latter is driven by the motor $d$, the lids are rolled forward on the rail $c$. Their position is such that the groove 4 makes contact with the contents of the troughs. At $b_h$ the lids receive liquid resin which, on the lid passing through the ventilated tunnel $f$, is again solidified. A further dipping channel $b_g$ contains a mixture of liquid bitumen and rubber solution, so that here the groove 4 receives the main sealing material. At $b_1$ the lid 1 rolls through another dipping channel containing a lacquer. The whole is hardened in the drying tunnel $g$. A heating spiral $h$ is mounted below the rail $c$ in the further path of the lid. When the lid rolls over this spiral, the resin coating applied at $b_h$ is softened and also the bitumen applied at $b_g$, together with the rubber, oozes out and combines with the resin or the thin lacquer coating respectively, in that it penetrates the pores of the same and fills them up. In the tunnel $k$ a complete drying of the different layers takes place. The finished lids now drop into the collecting reservoir $m$.

The method according to the invention may also be carried out in another manner: In a plant similar to that shown in Figs. 2 and 3, but comprising a single dipping channel, the groove 4 of the lids is, at first, covered with a thin resin layer. Then rubber rings are placed into these grooves and only after this, a plant according to Figs. 2 and 3 is used. However, in this latter the dipping channel for the fluid resin is omitted and the container $b_g$ comprises bitumen only which attacks the rubber ring when the lid rolls through the said container $b_g$ and produces on its surface a layer of a mixture of rubber and bitumen. The further process is similar to that described above.

In the description it has hitherto been only the question of rubber. In place of this substance its synthetic substitute, however, might be used.

What I claim is:

1. A method of applying sealing material to the joint surface of a disc-like container member comprising rolling the member along a predetermined path with its joint surface tangential to a substantially horizontal plane, causing said joint surface to dip in a bath of liquefied bitumen and rubber mixture, and passing the thereby coated surface through drying and heating zones, all while said member is rolling in said path.

2. A method after claim 1 in which the joint surface is given a coating of resin prior to dipping in the bath of bitumen and rubber.

3. A method after claim 1 in which the joint surface is given a coating of lacquer after dipping in the bath of bitumen and rubber.

4. In a method for manufacturing lids for hermetically closing containers, applying to the lids a sealing means consisting at least on its surface of rubber and bitumen, and heating said sealing means in order to cause the bitumen partly to ooze out of the sealing means so that the latter on the one side adheres to the lid and on the other side, after cooling of the same, its sealing surface has a better sliding quality.

5. In a method for manufacturing lids for hermetically closing containers, applying a sealing means consisting at least on its surface of rubber and bitumen to a groove of the lids, and heating said sealing means in order to cause the bitumen partly to ooze out of the sealing means so that the latter, on the one side adheres to the lid and, on the other side, after cooling of the same, its sealing surface has a better sliding quality.

6. In a method for manufacturing lids for hermetically closing containers, applying a resin layer to a groove of the lids, applying a sealing means consisting at least on its surface of rubber and bitumen to said resin layer, and heating said sealing means in order to cause the bitumen partly to ooze out of the sealing means so that the latter on the one side adheres to the lid and, on the other side, after cooling of the same, its sealing surface has a better sliding quality.

7. In a method for manufacturing lids for hermetically closing containers, immersing a groove of the lids in a solution containing rubber and bitumen to produce a sealing means, and heating said sealing means in order to cause the bitumen partly to ooze out of the sealing means so that the latter on the one side adheres to the lid and, on the other side, after cooling of the same, its sealing surface has a better sliding quality.

8. In a method for manufacturing lids for hermetically closing containers, bringing a rubber ring into a groove of the lids, immersing said rubber ring in solution containing bitumen to produce a sealing means, and heating said sealing means in order to cause the bitumen partly to ooze out of the sealing means so that the latter on the one side adheres to the lid and, on the other side, after cooling of the same, its sealing surface has a better sliding quality.

9. In a method for manufacturing lids for hermetically closing containers, applying a sealing means consisting at least on its surface of rubber and bitumen to a groove of the lids, giving a lacquer coating to said sealing means, and heating said sealing means in order to cause the bitumen partly to ooze out of the sealing means so that the latter, on the one side, adheres to the lid and, on the other side, the bitumen penetrates said lacquer coating.

HERBERT BRAND.